(12) United States Patent
He et al.

(10) Patent No.: US 8,699,795 B2
(45) Date of Patent: Apr. 15, 2014

(54) IMAGE PROCESSING DEVICE, IMAGE PROCESSING METHOD AND IMAGE PROCESSING PROGRAM

(75) Inventors: Shumian He, Yokohama (JP); Shigaku Iwabuchi, Tsukuba (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/504,854

(22) PCT Filed: Oct. 28, 2010

(86) PCT No.: PCT/JP2010/069159
§ 371 (c)(1),
(2), (4) Date: Jul. 11, 2012

(87) PCT Pub. No.: WO2011/052678
PCT Pub. Date: May 5, 2011

(65) Prior Publication Data
US 2012/0269437 A1 Oct. 25, 2012

(30) Foreign Application Priority Data

Oct. 29, 2009 (JP) ............................. P2009-248485

(51) Int. Cl.
*G06K 9/34* (2006.01)
(52) U.S. Cl.
USPC .......................................... 382/180; 382/274

(58) Field of Classification Search
USPC ......... 382/131, 218, 219, 180, 284, 173, 174, 382/154, 209, 132; 702/155; 340/961, 963; 345/592, 634; 358/521, 538; 33/554
See application file for complete search history.

(56) References Cited

U.S. PATENT DOCUMENTS 8,081,811 B2 * 12/2011 Moriya ..................... 382/131

FOREIGN PATENT DOCUMENTS

| JP | 2000-13659 A | 1/2000 |
|---|---|---|
| JP | 2005-136599 A | 5/2005 |
| JP | 2006-39658 A | 2/2006 |
| JP | 2008-28955 A | 2/2008 |
| JP | 2008-146490 A | 6/2008 |

* cited by examiner

*Primary Examiner* — Anh Do
(74) *Attorney, Agent, or Firm* — Sughrue Mion, PLLC

(57) ABSTRACT

To obtain increased user operability and user convenience in a terminal, the characteristic amount of a region in an image is calculated, the image is divided into a plurality of partial regions at least one of which has a different size on the basis of the characteristic amount thereby to acquire divided images, a display order of the divided images is decided based on the characteristic amount of each of the divided images and a link region for linking to a predetermined Web page is set in association with the divided image.

8 Claims, 17 Drawing Sheets

IMAGE PROCESSING DEVICE, IMAGE PROCESSING METHOD AND IMAGE PROCESSING PROGRAM

TECHNICAL FIELD

The present invention relates to a technical field of an image processing device, an image processing method and an image processing program for performing image processings on image data stored in a database.

BACKGROUND ART

In recent years, portable terminals such as portable wireless phones are widely spread and a user can easily view Web pages or animations such as broadcast programs via a portable terminal while he/she is out.

When the Web pages or animations are viewed, a display screen on the portable terminal is smaller than the screen of a personal computer or television, and thus the portable terminal displays image data or the like compressed based on the size of the display screen on the display screen. For example, a technique of a portable terminal described later is disclosed in Patent Literature 1, for example. When received original image data has a larger number of pixels than the display unit, the portable terminal reduces the number of pixels of the original image data to the number of pixels of the display unit for display. When a position is designated on the image by a pointing device, a corresponding coordinate in the original image data is calculated and an image region having the same number of pixels as that of the display unit is designated in the original image data on the basis of the corresponding coordinate and its information is transmitted to an image data distributing device. Thereby, when image data corresponding to an image region is received, the image region is displayed as a partially-enlarged image on the display unit without changing the number of pixels of the image data.

CITATION LIST

Patent Literature

Patent Literature 1: Japanese Patent Application Laid-Open No. 2000-13659

SUMMARY OF INVENTION

Technical Problem

Still images having several megapixels to gigapixels such as detailed map data, or high-resolution images such as animations of high-definition TV broadcast are disclosed on the Web along with the spread of broadband Internet connection via an optical fiber or the like, and can be viewed via a personal computer or the like.

However, in a portable terminal such as portable wireless phone, particularly since there are many functional limits on communication speed or storage capacity in addition to the size of the display screen, even when the above technique is used, a high-resolution image such as detailed map data is difficult smoothly view and an improvement in user operability cannot be efficiently achieved. The operability is less sufficient in the portable terminal than in the keyboard, and user convenience on the operation of the images on the display screen is not necessarily excellent.

The present invention has been made in terms of the above problems, and an exemplary object thereof is to provide an image processing device, an image processing method and an image processing program for achieving user convenience in a portable terminal.

It is another object of the present invention to provide an image processing device, an image processing method and an image processing program for extracting a characteristic region in one image and automatically displaying the characteristic region to a user without a user's direct operation.

Solution to Problem

In order to solve the problems, the invention according to claim 1 includes a characteristic amount calculating means that calculates the characteristic amount of a region in an image, an image dividing means that divides the image into a plurality of partial regions at least one of which has a different size on the basis of the characteristic amount, and acquires divided images, a display order deciding means that decides a display order of the plurality of divided images based on the characteristic amount of each of the divided images, and a link region setting means that sets a link region for linking to a predetermined Web page in association with the divided image.

The invention according to claim 2 is the image processing device according to claim 1 further including a transmitting means that transmits image data on the divided image and data on the link region based on the display order.

The invention according to claim 3 is the image processing device according to claim 1 or claim 2, wherein the display order deciding means decides the display order based on user information.

The invention according to claim 4 is the image processing device according to any one of claims 1 to 3 further including a link region visualizing means that performs an image processing on the link region to be visible.

The invention according to claim 5 is the image processing device according to any one of claims 1 to 4 further including an associated product linking means that associates a product associated with the divided image to the link region.

The invention according to claim 6 is the image processing device according to any one of claims 1 to 5, wherein the characteristic amount is at least one of a value of hue of the image, a value of chromaticness, a value of brightness, a directional component of the hue, a directional component of the chromaticness, and a directional component of the brightness.

The invention according to claim 7 includes a characteristic amount calculating step of calculating the characteristic amount of a region in an image, an image dividing step of dividing the image into a plurality of partial regions at least one of which has a different size on the basis of the characteristic amount, and acquiring divided images, a display order deciding step of deciding a display order of the plurality of divided images based on the characteristic amount of each of the divided images, and a in region setting step of setting a link region for linking to a predetermined Web page in association with the divided image.

The invention according to claim 8 causes a computer to function as a characteristic amount calculating means that calculates the characteristic amount of a region in an image, an image dividing means that divides the image into a plurality of partial regions at least one of which has a different size on the basis of the characteristic amount, and acquires divided images, a display order deciding means that decides a display order of the plurality of divided images based on the characteristic amount of each of the divided images, and a link region setting means that sets a link region for linking to a predetermined Web page in association with the divided image.

The invention according to claim 9 records an image processing program therein, the image processing program causing a computer to function as a characteristic amount calculating means that calculates the characteristic amount of a region in an image, an image dividing means that divides the image into a plurality of partial regions at least one of which has a different size on the basis of the characteristic amount, and acquires divided images, a display order deciding means that decides a display order of the plurality of divided images based on the characteristic amount of each of the divided images, and a link region setting means that sets a link region for linking to a predetermined Web page in association with the divided image.

Advantageous Effects of Invention

According to the present invention, the characteristic amount of a region in an image is calculated, the image is divided into a plurality of partial regions at least one of which has a different size, on the basis of the characteristic amount, thereby to acquire divided images, a display order of the divided images is decided based on the characteristic amount of each of the divided images, a link region for linking to a predetermined Web page is set in association with the divided image, and thus the divided image setting the link region therein can be automatically reproduced in a portable terminal without a user's direct operation so that the user clicks a part in which the user is interested thereby to access other information, thereby enhancing user convenience at the terminal.

DESCRIPTION OF EMBODIMENTS

The best modes for, carrying out the present invention will be described below with reference to the drawings.

First Embodiment

At first, a schematic structure and functions of an image processing server system according to a first embodiment of the present invention will be described with reference to the drawings.

Figure 1:
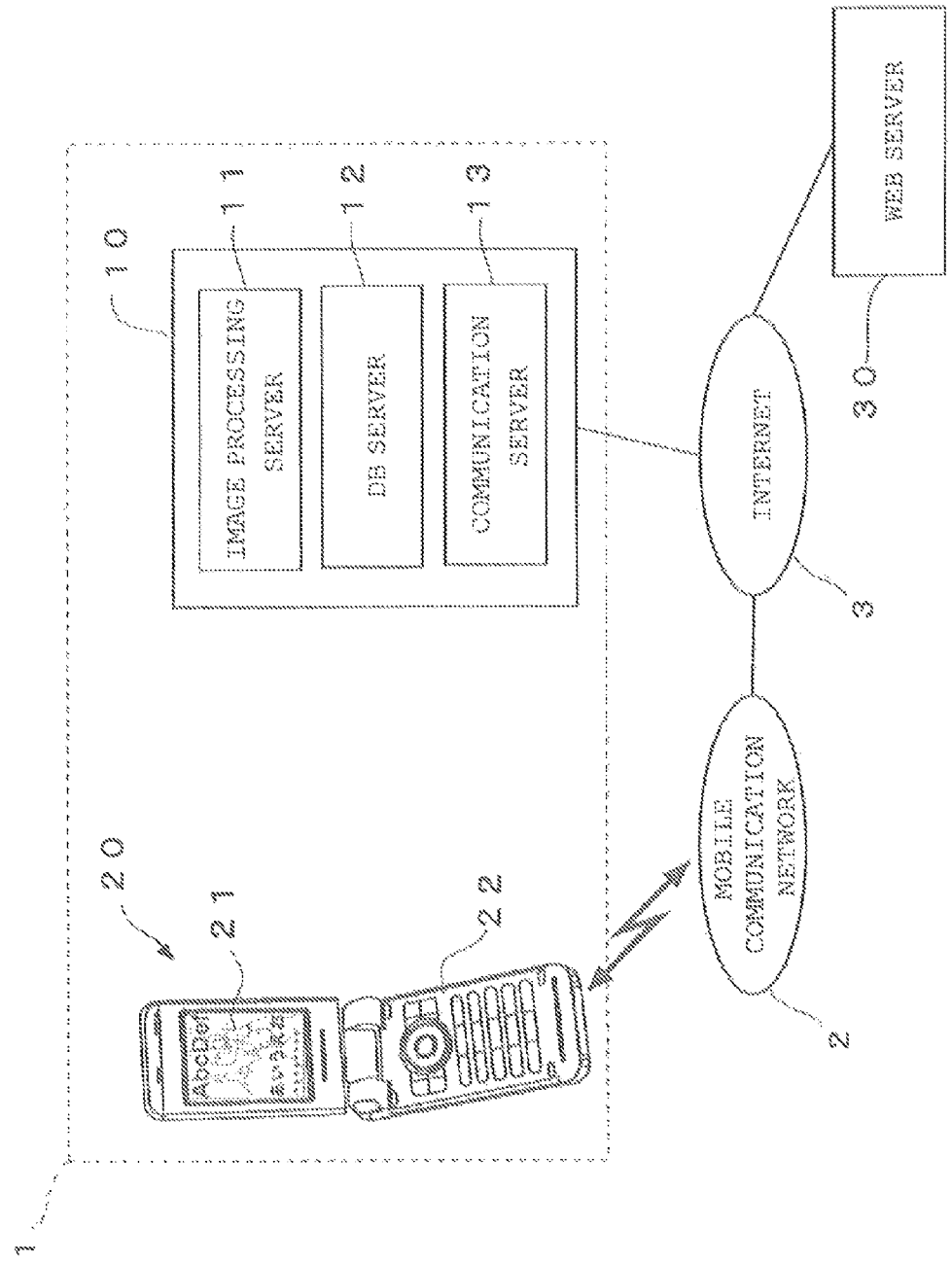
FIG. 1 is a schematic diagram showing an exemplary schematic structure of an image processing server system according to a first embodiment of the present invention.
Figure 2:
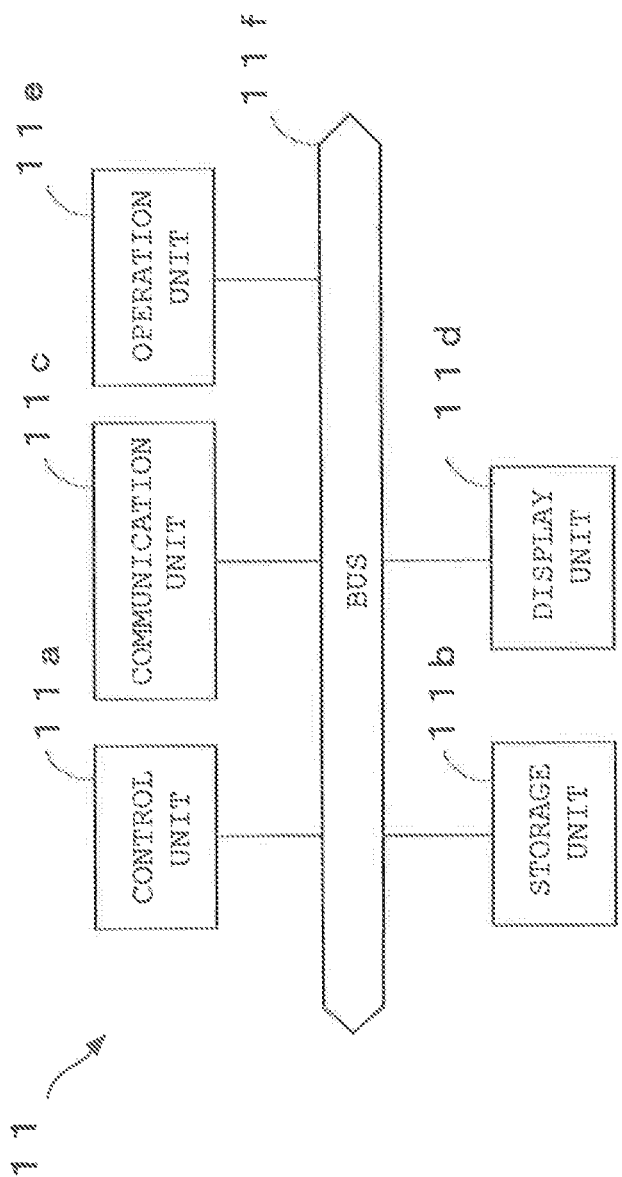
FIG. 2 is a block diagram showing an exemplary schematic structure of an image processing server of FIG. 1.

FIG. 1 is a schematic diagram showing an exemplary schematic structure of the image processing server system according to the first embodiment of the present invention. FIG. 2 is a block diagram showing an exemplary schematic structure of an image processing server.

As shown in FIG. 1, an exemplary image processing server system 10 in an image processing device includes an image processing server 11 that performs image processings in response to requests or the like from a portable terminal 20, a database server 12 that stores the processing results of the image processing server 11 and image data from a Web server 30, and a communication server 13 that makes communication with the portable terminal 20 or the Web server 30.

The image server system 10 is connected to a network 3 such as Internet, the portable terminal 20 is connected to a mobile communication network 2, and the mobile communication network 2 and the network 3 are connected via a gateway or the like for protocol conversion or content-describing language conversion. The image server system 10 is connected to the Web server 30 that holds data such as HTML (HyperText Markup Language) documents or images via the network 3 such as Internet. The portable terminal 20 transmits an image to be viewed, or information such as URL (Uniform Resource Locator) of an original image to the image server system 10.

The image server system 10 receives original image data on an original image from the Web server 30 corresponding to a URL, creates original image information on the original image from the original image data or processes the original image data to be adapted to the portable terminal 20, and transmits the information or image data on the original image to the portable terminal 20. For example, the URL of the image server system 10 as an access destination is incorporated in a software at the portable terminal 20 side, the URL of the Web server 30 as an original image data destination is directly input or a part where the URL of the Web server 30 is embedded is clicked at the portable terminal 20 side and thus request information is transmitted from the portable terminal 20 to the image server system 10. Then, the image server system 10 acquires the original image data from the Web server 30 and then can provide the or image data subjected to predetermined processings to the portable terminal 20. In this way, the portable terminal 20 acquires the information from the Web server 30 or the like via the image server system 10 on the basis of the installed software. The original image data may be data inside the image server system 10.

As shown in FIG. 2, the image processing sever 11 functioning as a computer includes a control unit 11a that totally controls the image processing server 11 or computes the image processings, a storage unit 11b that holds halfway results of the control unit 11a, a communication unit 11c that makes communication with the database server 12 or the communication server 13, a display unit 11d that displays images, text and the like, and an operation unit 11e that is configured of a keyboard, a mouse and the like, and the units are mutually connected via a bus 11f.

The control unit 11a has a CPU (Central Processing Unit), and performs various image processings such as compressing image data downloaded from the Web server 30 and reducing a resolution of the image, or functioning as a characteristic amount calculating means that calculates the characteristic amount from the image data. The CPU is of multi-core type in which a plurality of CPU cores are present in one CPU package, and thus can perform parallel processings.

The storage unit 11b has a RAM (Random Access Memory), a ROM (Read Only Memory), a hard disc, and the like, where an image processing program is loaded or a memory space for holding image data is formed.

The communication unit 11c makes communication with the database server 12 or the communication server 13 via, a local area network. The display unit 11d is configured of a CRT (Cathode Ray Tube), a liquid crystal display device, an EL (Electro Luminescence) device, or the like.

The database server 12 controls a database made of a hard disc. The database in the database server 12 stores therein image data downloaded from the Web server 30, or data on the image-processed data, or requests from the portable terminal 20.

The communication server 13 makes communication with the portable terminal 20 via a base station in the mobile communication network 2, or makes communication with the Web server 30 via the network 3. It functions as a gateway or authentication server.

Then, as shown in FIG. 1, the portable terminal 20 includes a display unit 21 that displays images, text and the like, an operation unit 22 that is used for operating a pointer displayed on the display unit 21, and though not illustrated, a wireless communication unit that exchanges data with the image server system 10, a speech input/output, unit that inputs and outputs a speech for communication, a storage unit that stores data and the like transmitted from the image server system 10, a control unit that performs various controls on the portable terminal 20, and the like.

The display unit 21 is configured of a liquid crystal display device, an EL (Electro Luminescence) device or the like. The operation unit 22 is configured of various keys. The user moves the pointer displayed on the display unit 21, or selects and confirms a part of the image via the operation unit 22.

Exemplary image data used for the present embodiment will be described below with reference to FIG. 3.

Figure 3:
FIG. 3 is a schematic diagram showing exemplary image data having a different resolution in a database of the image processing server of FIG. 1.

FIG. 3 is a schematic diagram showing exemplary image data having a different resolution in a database in the image server. As shown in FIG. 3, an image (original image) 40 is a schematic diagram showing an exemplary original image corresponding to original image data present in the database in the Web server 30 or the image processing server system 10.

The Web server 30 has original image data indicated by the URL of the user-requested image from the portable terminal 20, and has image data of the original image 40 as shown in FIG. 3, for example. The image data of the original image 40 is image data having several megapixels to gigapixels such as detailed map data, and cannot be displayed on the portable terminal 20 as it is.

The image data of the original image 40 downloaded, from the Web server 30 into the image server system 10 is stored in the database server 12. The image processing server 11 performs an image processing on the image data of the original image 40, and creates image data of images 41, 42, 45 with various resolutions, or image data of partial images in which the user may be interested. The original image information on the original image 40 may include information on the number of pixels (resolution) for the original image data or the created image data with various resolutions, or a ratio between width and height.

The operations of the present embodiment will be described below with reference to the drawings.

Figure 4:
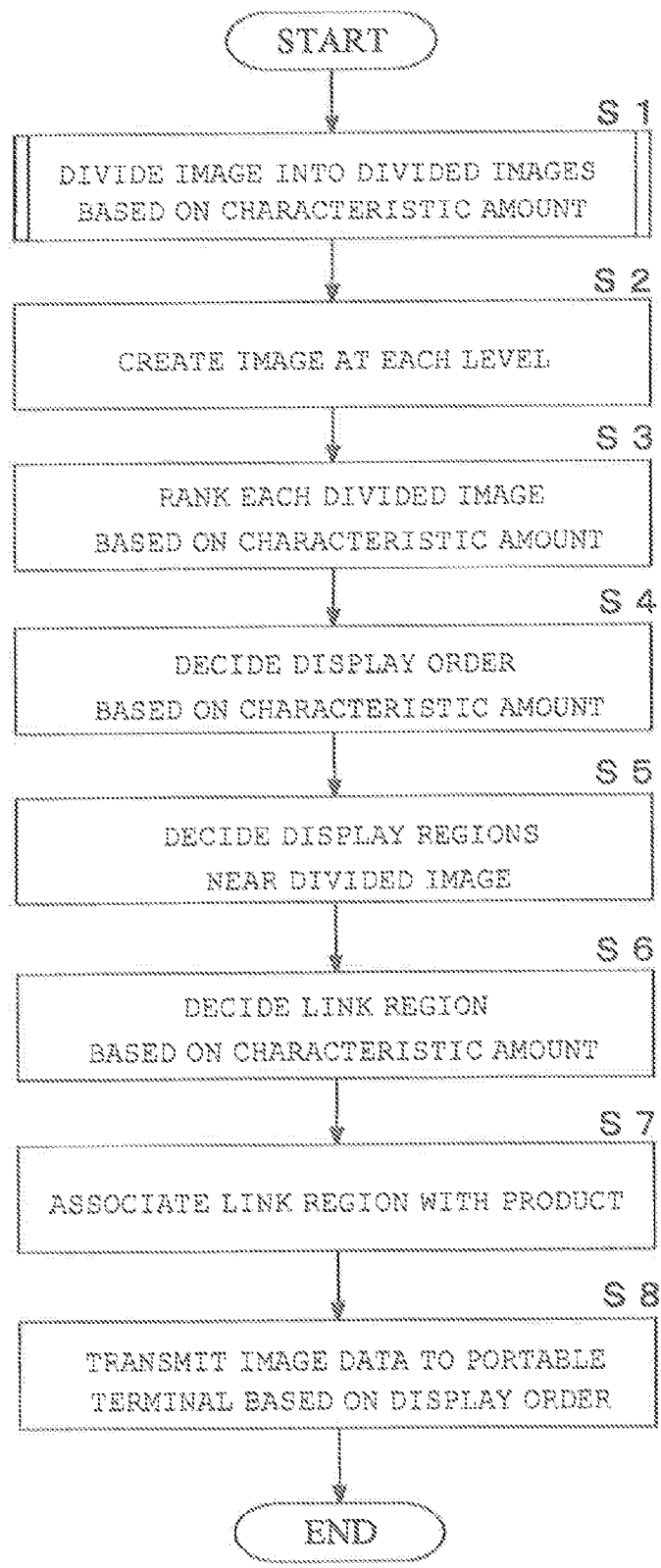
FIG. 4 is a flowchart showing exemplary scenario reproduction by the image processing server of FIG. 1.
Figure 5:
FIG. 5 is a schematic diagram showing an exemplary resultant image based on the calculated characteristic amount per pixel of original image data of FIG. 3.
Figure 6:
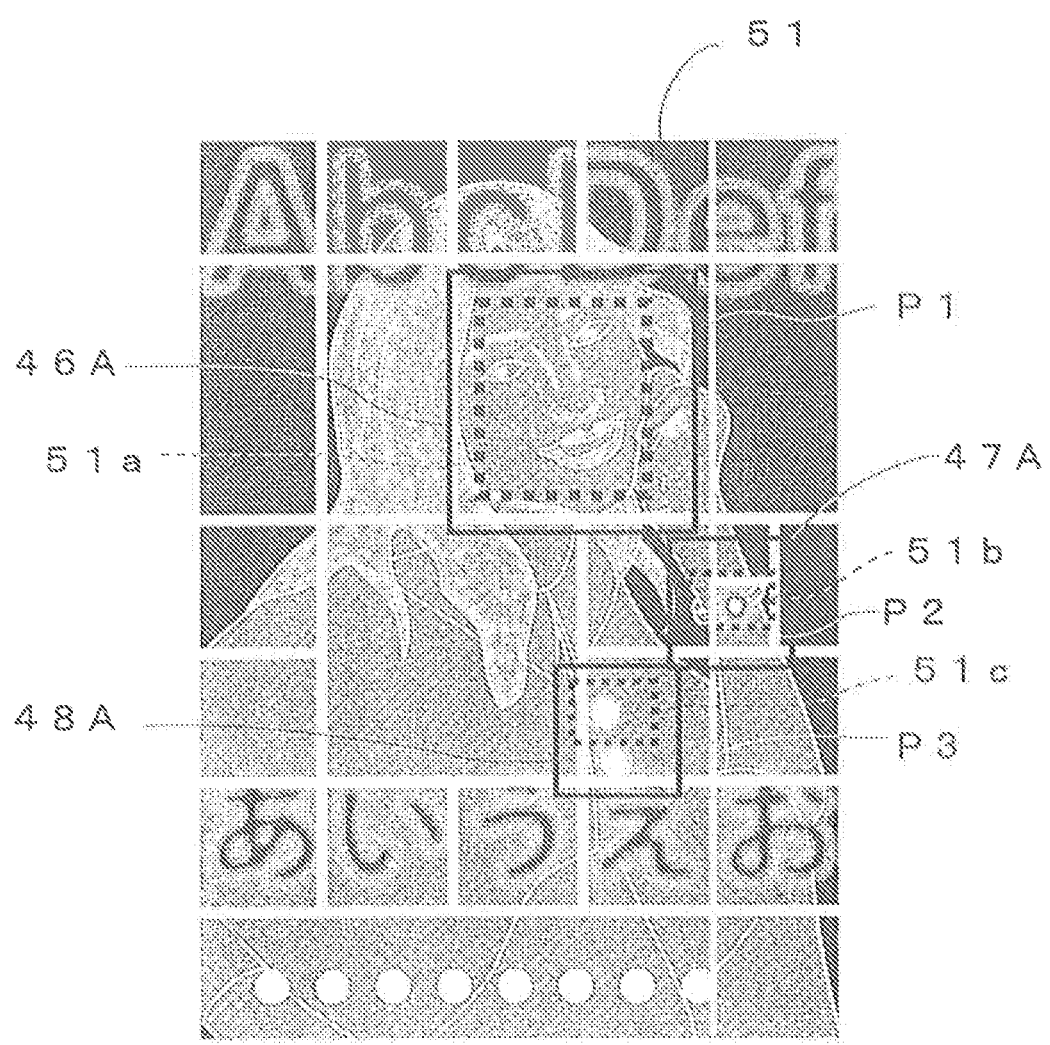
FIG. 6 is a schematic diagram showing an exemplary original image of FIG. 3 divided into rectangular regions.
Figure 7:
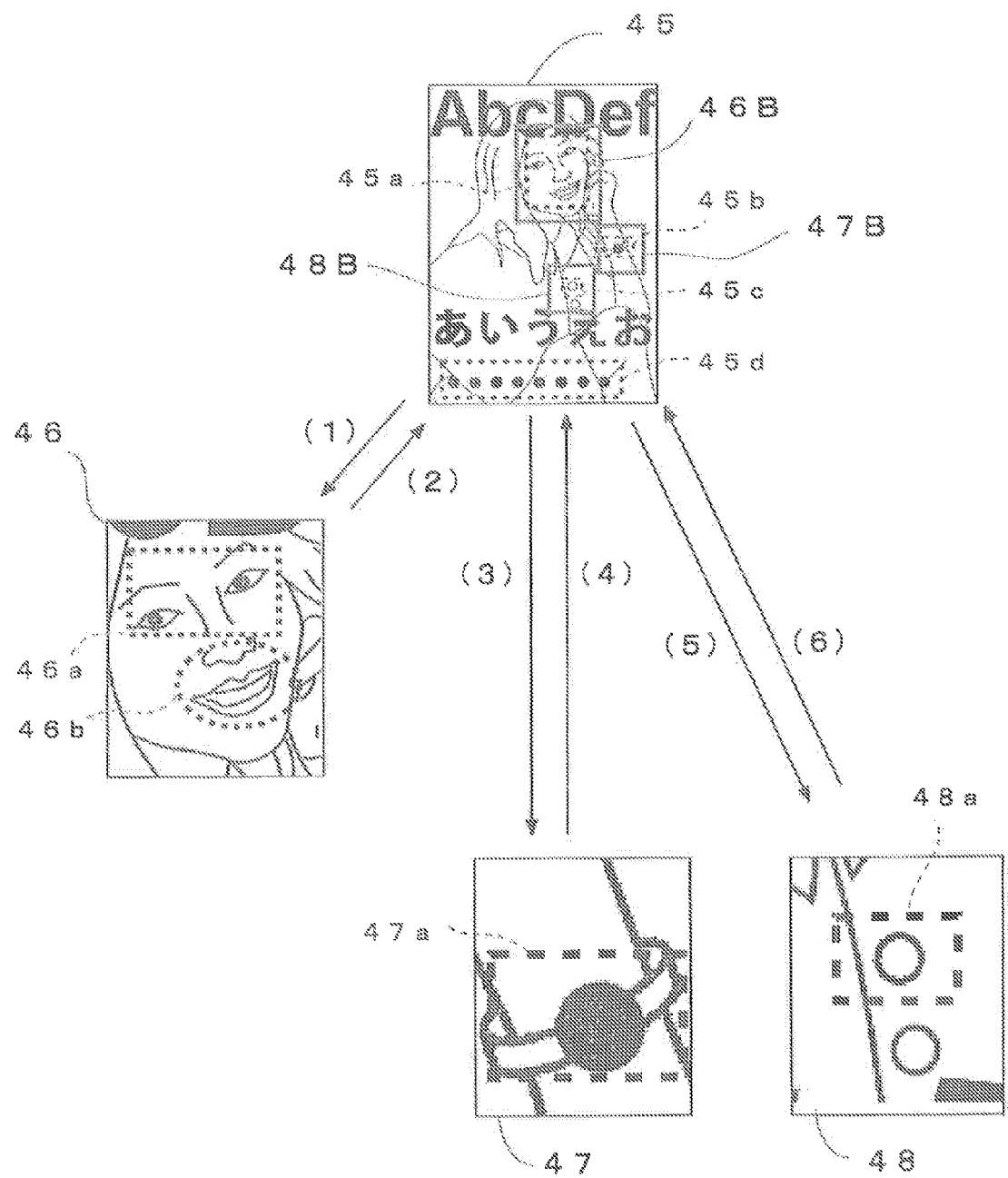
FIG. 7 is a schematic diagram showing exemplary scenario reproduction according to the first embodiment of the present invention.

FIG. 4 is a flowchart showing exemplary scenario reproduction by the image processing server 11. FIG. 5 is a schematic diagram showing an exemplary resultant image based on the calculated characteristic amount per pixel of the original image data of FIG. 3. FIG. 6 is a schematic diagram showing an exemplary original image divided into rectangular regions. FIG. 7 is a schematic diagram showing exemplary scenario reproduction.

At first, the control unit 11a in the image processing server 11 receives, from the portable terminal 20, information on the URL where an image in a site is present or information on a desired compression rate (image resolution level). At this time, the control unit Ha receives information on the functions of the portable terminal 20, such as a size or resolution of the screen of the display unit 21 in the portable terminal 20. The control unit 11a in the image server 11 accesses the Web server 30 corresponding to the requested URL, downloads the image data of the original image 40 as shown in FIG. 3, and stores the image data of the original image 40 in the database via the database server 12.

An outline of the scenario reproduction according to the present embodiment will be described below with reference to the flowchart of FIG. 4.

At first, as shown in FIG. 4, the control unit 11a in the image processing server 11 divides an image into partial regions based on the characteristic amount thereby to acquire divided images (step S1). Specifically, at first, as shown in FIG. 5, the characteristic amount of the original image 40 is calculated to acquire an image 50. As shown in FIG. 6, the image is divided into partial regions (divided images P1, P2, P3) at least one of which has a different size, on the basis of the characteristic amount. A typical image is divided into uneven divided images through the processing.

Here, the characteristic amount is an index indicating a degree of importance of an object present in a still image for human-vision perception. For the visual perception, it is known that hue, chromaticness, brightness and object contour (edge) are important factors. The calculation of the characteristic amount or the division of the image based on the characteristic amount will be described below in detail.

In this way, the image processing server 11 functions as an exemplary characteristic amount calculating means that calculates the characteristic amount of a region in the image. The image processing server 11 divides an image such as the original image 40 into a plurality of partial regions at least one of which has a different size, on the basis of the characteristic amount, thereby to acquire divided images, for an exemplary image dividing method.

Then, the control unit 11a creates images at each resolution level for the original image 40 (step S2). Specifically, when the data amount of image data of the original image 40 is large relative to the display function of the portable terminal 20, the control unit 11a creates image data of a low-resolution image at each level of the original image 40 on the basis of the image compression. For example, the control unit 11a reduces the image size of the original image 40, and creates image data of an image 45 with a reduced resolution, which is reduced in the number of pixels to be accommodated in the screen of the display unit 21, the images 41, 42, and the like.

When the resolution is lowered and the number of pixels is reduced, the control unit 11a divides the original image data of the original image 40 into multiple regions to acquire divided images one time. The control unit 11a reduces the resolution of each divided image to acquire a low-resolution divided image, and then integrates the divided images to acquire a low-resolution integrated image through the parallel processings using the multi-core CPU or the like. In this way, the image to be compressed and reduced into a low resolution is first divided to acquire divided images and the divided images are compressed through the parallel processings by a plurality of resolution reducing means, thereby fast compressing the images. When a megapixel image is viewed in the portable terminal 20 in response to a user's request, the image with a reduced resolution can be fast transmitted in response to the request.

Then, the control unit 11a ranks each divided image based on the characteristic amount (step S3). Specifically, as shown in FIG. 6, the control unit 11a ranks each divided image P1, P2, P3 or the like based on the characteristic amount in the descending order or ascending order of the value of the characteristic amount of each divided image. The value of the characteristic amount of each divided image P1, P2 or P3 uses an average value or the like of the characteristic amount in the partial region of each divided image.

Then, the control unit 11a decides a display order based on The characteristic amount (step S4). Specifically, the control unit 11a extracts the divided images having a certain characteristic amount or more, or at higher ranks, and sets the display order for preferentially displaying the divided images at higher ranks in an image 51. In this way, the control unit 11a functions as an exemplary display order deciding means that decides the display order of multiple divided images based on the characteristic amount of each divided image.

Then, the control unit 11a decides display regions near a divided image to be displayed (step S5). Specifically, the control unit 11a decides display frames 45A, 47A and 48A indicating the display regions to include part of or all the divided images P1, P2 and P3 as shown in FIG. 6. The size of the display frame 46A is decided based on the size of the display unit 21 in the portable terminal 20 and the resolution required for displaying the divided image P1 on the display unit 21. The sizes of the divided images P1, P2 and P3 are different, and for the divided image P2, the display frame 47A is decided so as to include the divided image P2. For the image 45 in FIG. 7, the display frames corresponding to the display frames 46A, 47A and 48A are display frames 463, 478 and 470, respectively.

Then, the control unit ha decides a link region based on the characteristic amount (step S6). Specifically, the control unit 11a decides link regions including all or part of the divided images for the divided images P1, P2 and P3 to be displayed in the user's portable terminal 20, and link frames 51a, 51b and 51c surrounding the link regions. The information on the link regions and link frames is described in a markup language such as HTML.

The link frames 51a, 51b and 51c are decided around the parts having a large characteristic amount in the divided images. The link frames 51a, 51b and 51c may be decided with reference to the images 50 and 51 in which a person is displayed with the characteristic amount in a thermographic manner. When the user clicks a link region in a link frame in the portable terminal 20, the region jumps to a predetermined Web page associated with the link region. In this way, the control unit 11a functions as an exemplary link region setting means that sets a link region for linking to a predetermined Web page in association with the divided image. For example, the control unit 11a sets a link region near the divided image or sets a link region within the divided image.

Then, the control unit 11a associates a link region with a product (step 37). Specifically, the control unit 11a extracts information (such as HTML data of a product page) on products or services associated with items photographed in the images of the divided images P1, P2 and P3, as exemplary products associated with the divided images, from the database in the database server 12. More specifically, since the divided image P1 is a main image of a face, the control unit 11a requests URL of a product or service associated with the face to the database server 12, and since the divided image 22 is a main image of a watch, the control unit 11a requests URL of a product or service associated with the watch to the database server 12. Then, the control unit 11a transmits the data to the database server 12 for associating the extracted URL with the information on coordinate or resolution of each link frame 51a, 51b, 51c and storing it in the database of the database server 12.

The associated information on the link region and the product may be stored in the hard disc of the storage unit 11b. The product may be automatically extracted through image recognition, but a display software for searching and displaying product or service information is created together with the image 40, or the image 50 indicating the characteristic amount, or the image 51 indicating the division, and an information provider or the like who wants to provide the product or service may associate a product or service to be sold while viewing the image displayed on the display unit 11d in the image processing server 11. In this way, the control unit 11a functions as an exemplary associated product linking means that associates a product associated with the divided image to a link region.

Then, the control unit ha transmits the image data to the portable terminal 20 based on the display order (step 38) Specifically, the control unit 11a and the communication unit 11c sequentially transmit image data on an image 46, an image 47 and an image 48 corresponding to the display frames 465, 475 and 485, respectively, to the portable terminal 20 via the communication server 13 as shown in FIG. 7. The image data contains information on link regions of the link frames 51a, 51b and 51c described in a markup language such as HTML. In this way, the control unit 11a functions as an exemplary transmitting means that transmits the image data on the divided images and the data on the link regions based on the display order.

A sub-routine of dividing an image into divided images based on the characteristic amount in step S1 will be described below in detail with reference to the drawings.

Figure 8:
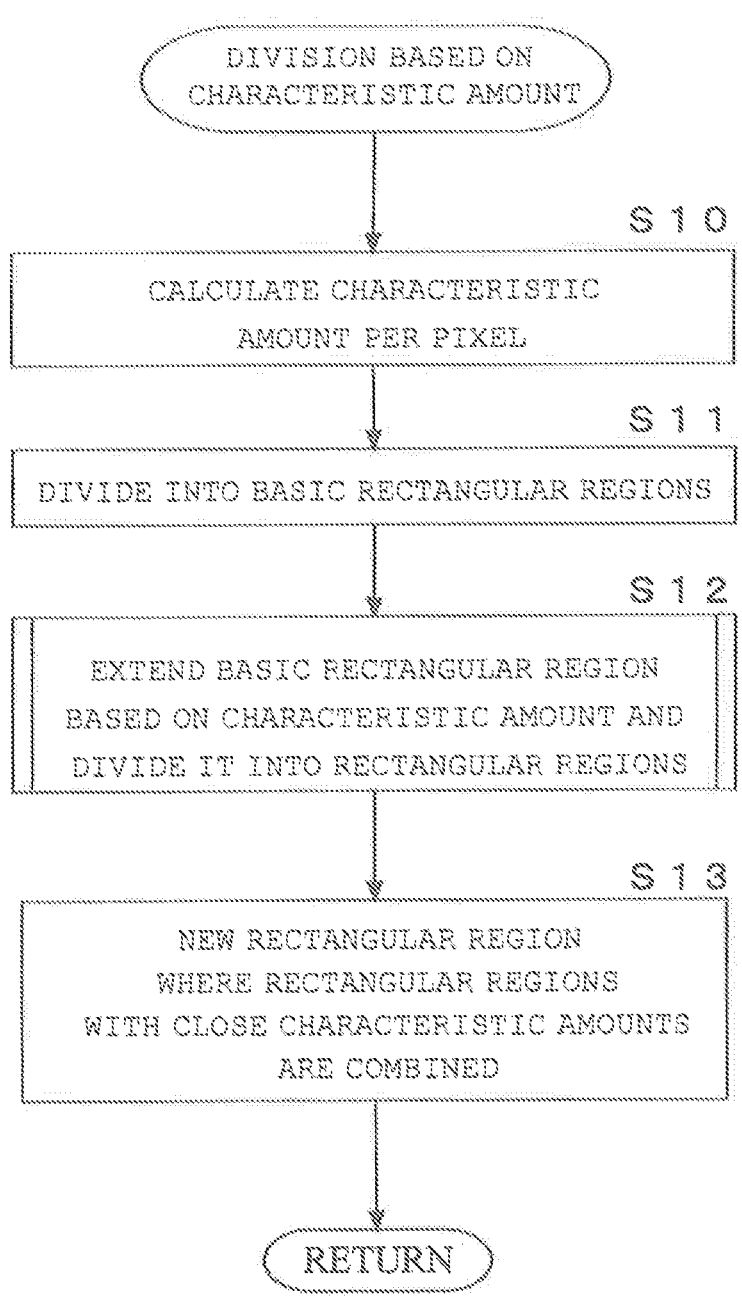
FIG. 8 is a flowchart showing an exemplary sub-routine of division based on the characteristic amount of FIG. 4.
Figure 9:
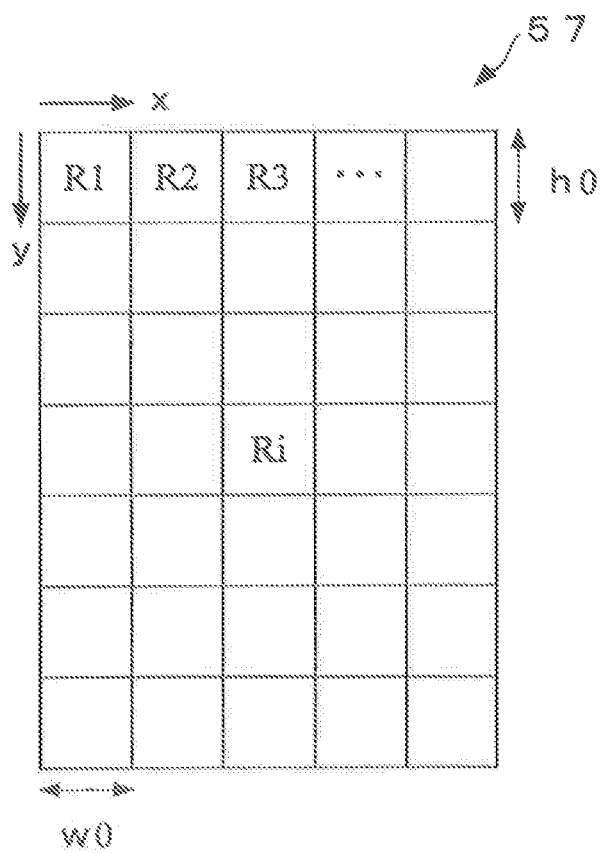
FIG. 9 is a schematic diagram showing, by way of example, how an image of FIG. 5 is divided into basic rectangular regions as basic units.

FIG. 8 is a flowchart showing an exemplary sub-routine of division based on the characteristic amount. FIG. 9 is a schematic diagram showing, by way of example, how an image of image data on the characteristic amount is divided into basic rectangular regions as basic units.

At first, the control unit 11a in the image processing server 11 calculates the characteristic amount per pixel of the image data of the original image 40 as shown in FIG. 8 (step S10). In this way, the control unit 11a calculates the characteristic amount of a region in the original image 40 or the like as an exemplary characteristic amount calculating means.

In the present embodiment, in order to find the characteristic amount, the characteristic amount is calculated as the visual characteristic amount based on a value of hue, a value of chromaticness, a value of brightness, a directional component of hue, a directional component of chromaticness and a directional component of brightness. The value of hue, the value of chromaticness and the value of brightness are found by typical equations for converting RGB (Red, Green, Blue) data into HSV (Hue, Saturation, Value) data. Each directional component of hue, chromaticness or brightness uses a maximum value obtained by a Gabor filter of 0°, 45°, 90° or 135°. The characteristic amount is assumed as a value obtained by weighting and adding the six components. For a preprocessing of finding the characteristic amount, the image data is downsized and further extended by use of a Gaussian pyramid, and thus the image data with a noise or the like removed is used As described above, an exemplary characteristic amount is at least one of the value of hue, the value of chromaticness, the value of brightness, the directional component of hue, the directional component of chromaticness and the directional component of brightness of an image such as the original image 40.

As described above, the control unit 11a calculates the image data of the image 50 in a heat map as shown in FIG. 5 on the basis of the strength or magnitude of the characteristic amount. FIG. 5 is a diagram schematically showing the heat map of the original image 40 only for explanation.

Then, the control unit 11a divides the image 50 in the heat map into the basic rectangular regions as shown in FIG. 9 (step S11). The size of the basic rectangular region as basic unit is of the width w0 and of the height h0. A positive-integer multiple of the width w0 and the height h0 is a length of the sides of the image 57. The width w0 and the height h0 may be the same, or a ratio between the width w0 and the height h0 may be the same as the ratio of the display unit 21 in the portable terminal 20. The origin is at the upper left of the figure, the x axis is rightward and the y axis is downward.

Then, the control unit 11a extends the rectangular region based on the characteristic amount and divides it into rerctanqular regions (step S12). In the step, the control unit 11a combines adjacent basic rectangular regions having the close characteristic amounts and segments the image into human-perceptible regions. The rectangular regions enable the subsequent processings or the processings in the portable terminal 20 to be easily performed.

A sub-routine of extending a rectangular region will be described herein in detail with reference to FIGS. 10 to 13.

Figure 10:
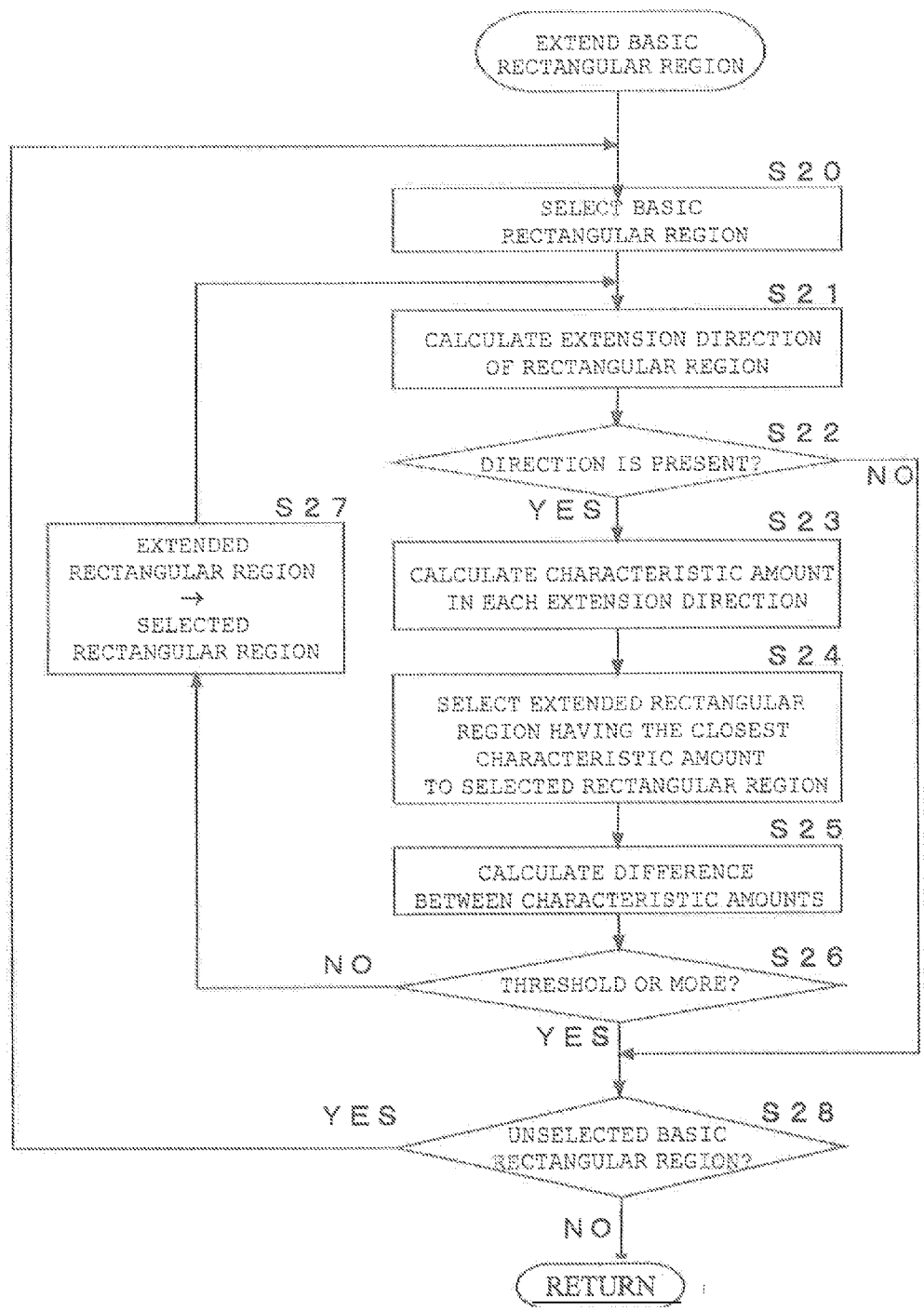
FIG. 10 is a flowchart showing an exemplary sub-routine of extending a basic rectangular region of FIG. 8.
Figure 11A:
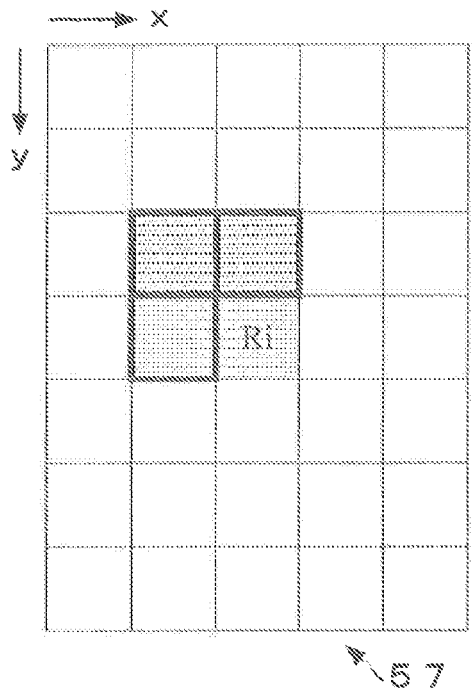
FIGS. 11A to 11D are schematic diagrams showing how to extend the basic rectangular region of FIG. 10 by way of example.
Figure 11B:
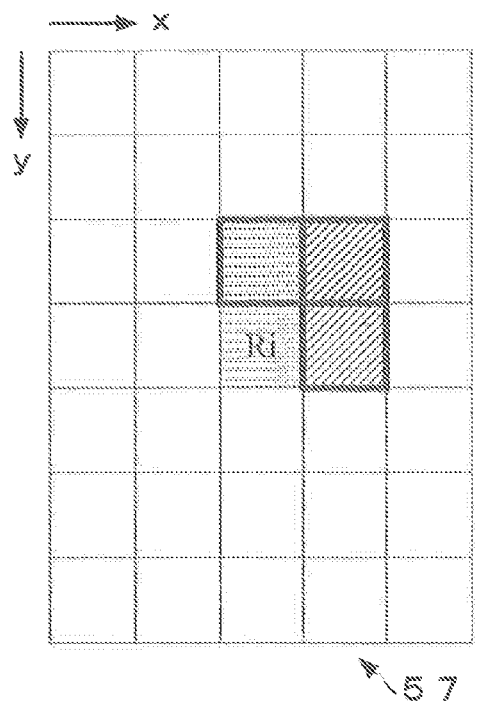
Figure 11C:
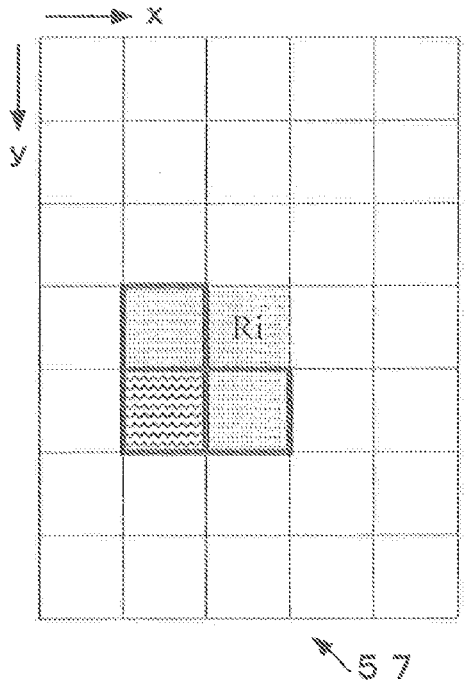
Figure 11D:
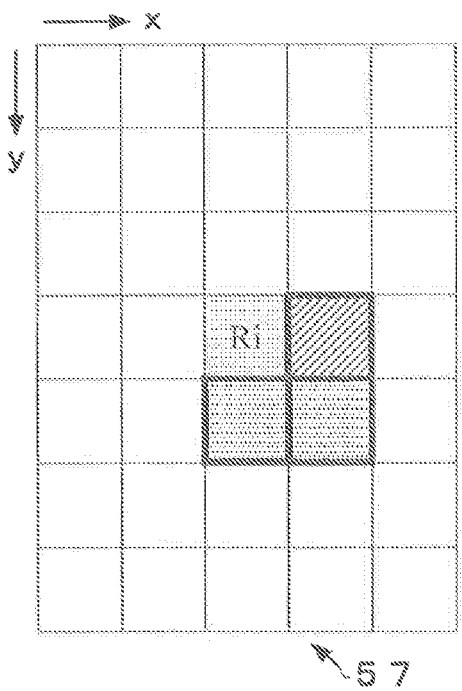
Figure 12:
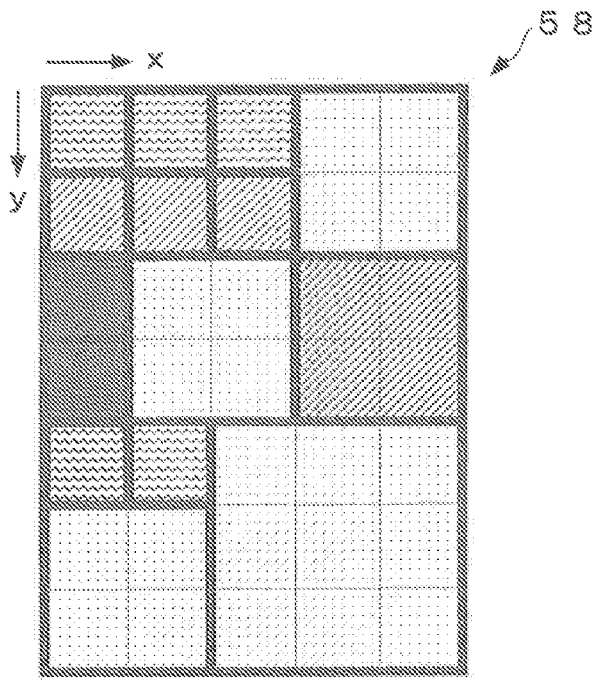
FIG. 12 is a schematic diagram showing an exemplary image divided into rectangular regions according to the processings of FIG. 10.

FIG. 10 is a flowchart showing an exemplary sub-routine of extending a unit basic rectangular region. FIGS. 11A to 11D are schematic diagrams showing how to extend a basic rectangular region by way of example. FIG. 12 is a schematic diagram showing how an image is divided into rectangular regions according to the processing of extending a basic rectangular region by way of example.

As shown in FIG. 10, at first, the control unit selects an arbitrary basic rectangular region from the image 57 divided into the basic rectangular regions (step S20). For example, as shown in FIG. 9, the basic rectangular region Ri is selected from the image 57.

Then, the control unit 11a calculates a direction in which the rectangular region extends (step S21). Specifically, as shown in FIG. 11, the rectangular region is extended in four directions. At first, for the first extension directions, as shown in FIG. 11A, the basic rectangular region R1 is extended toward the adjacent basic rectangular regions in the direction (−x, 0), in the direction (0, −y) and in the direction (−x, −y), respectively. For the second extension directions, as shown in FIG. 11B, the basic rectangular region. Ri is extended toward the adjacent basic rectangular regions in the direction (x, 0), in the direction (0, −y) and in the direction respectively. For the third extension directions, as shown in FIG. 11C, the basic rectangular region Ri is extended toward the adjacent basic rectangular regions in the direction (−x, 0), in the direction (0, y) and in the direction (−x, y) respectively. For the fourth extension directions, as shown in FIG. 11D, the basic rectangular region Ri is extended toward the adjacent basic rectangular regions in the direction (x, 0), in the direction (0, y) and in the direction (x, y), respectively. As shown in FIG. 11, the shapes of the extended rectangular regions are similar to the shape of the basic rectangular region.

The control unit 11a determines whether a basic rectangular region is present in an extension direction (step S22). Even when one extension direction is present (step S22; YES), the control unit 11a calculates an average characteristic amount between the basic rectangular region in each extension direction and the selected rectangular region (step S23) Specifically, as shown in FIG. 11, the control unit 11a calculates an average characteristic amount between the basic rectangular region in each extension direction and the rectangular region (basic rectangular region Ri) selected in step S20.

The control unit 11a selects an extended rectangular region having the closest characteristic amount to the selected rectangular region (step S24). For example, in FIG. 11A, the characteristic amounts of all, the extended partial regions are the same, in FIG. 11B, the characteristic amount of one extended partial region is the same, in FIG. 11C, the characteristic amounts of two extended partial regions are the same, and in FIG. 11D, the characteristic amounts of two extended partial regions are the same. Thus, the extended rectangular regions to which the basic rectangular region is extended in the extension directions as shown in FIG. 11A are assumed as the selected extended rectangular regions. In FIG. 11, a hatching pattern in each basic rectangular region indicates the value of the characteristic amount.

Then, the control unit 11a calculates a difference between the characteristic amount of the selected rectangular region and the characteristic amount of the selected extended rectangular region (step S25). Specifically, as shown in FIG. 11A, the control unit 11a calculates a difference between the characteristic amount of the selected rectangular region (the basic rectangular region Ri) and the characteristic amount of the selected extended rectangular region. Then, the control unit 11a determines whether the difference between the characteristic amounts is a threshold or more (step S26).

When the difference between the characteristic amounts is smaller than the threshold (step S26; NO), the control unit 11a assumes the calculated extended rectangular region as the selected rectangular region (step S27), and returns to step S21 to further extend the rectangular region.

On the other hand, when the difference between the characteristic amounts is the threshold or more (step S26; YES), the control unit 11a finishes extending the rectangular region, and determines whether an unselected basic rectangular region is present (step S28). The unselected rectangular regions include the basic rectangular region used for extension. When the difference between the characteristic amounts is the threshold or more in step S26, the extended parts of the selected extended rectangular region are also the unselected basic rectangular regions.

When an unselected basic rectangular region is present (step S28; YES), the control unit 11a returns to step S20 to extend a different basic rectangular region.

When an extension direction is not present (step S22; NO) and an unselected basic rectangular region is not present (step S28; NO), that is, when all the basic rectangular regions have been used, the control unit 11a terminates the sub-routine. At this time, the image 50 in the heat map is divided into the rectangular regions similar to the basic rectangular region in the example of the present embodiment. When extension is started from the basic rectangular region R1, the extension directions are limited and thus calculation does not need to be made for four directions.

Then, the sub-routine of extending the basic rectangular region ends and step S12 ends. For example, as shown in FIG. 12, the heat map image 50 is divided into rectangular regions, and as shown in FIG. 12, an image 58 configured of the rectangular regions including rectangular regions with different sizes is generated. The size of the extended rectangular region is positive-number multiples as large as the basic rectangular region as a divided image unit since the extended rectangular region is a collection of adjacent basic rectangular regions. The extended rectangular region is of the rectangular divided images extended in the two directions of the adjacent sides of the basic rectangular region, that is, extended by positive-integer multiples in the x direction and in the y direction.

As shown in FIG. 8, the control unit 11a creates a new rectangular region in which the rectangular regions with the close characteristic amounts are combined after step S12 (step S13). As shown in FIG. 12, the adjacent basic rectangular regions or extended rectangular regions having the close characteristic amounts are combined. Specifically, the rectangular regions having the same sire as an arbitrary rectangular region and having the close characteristic amount thereto are combined to acquire an image 59. A size of a rectangular region in the image 59 or a partial region is positive-integer multiples of the basic rectangular region as divided image unit. The partial region corresponds to a rectangular divided image obtained by extending the basic rectangular region in the two directions of the adjacent sides of the basic rectangular region, that is, by positive-integer multiples in the x direction and in the y direction.

Figure 13:
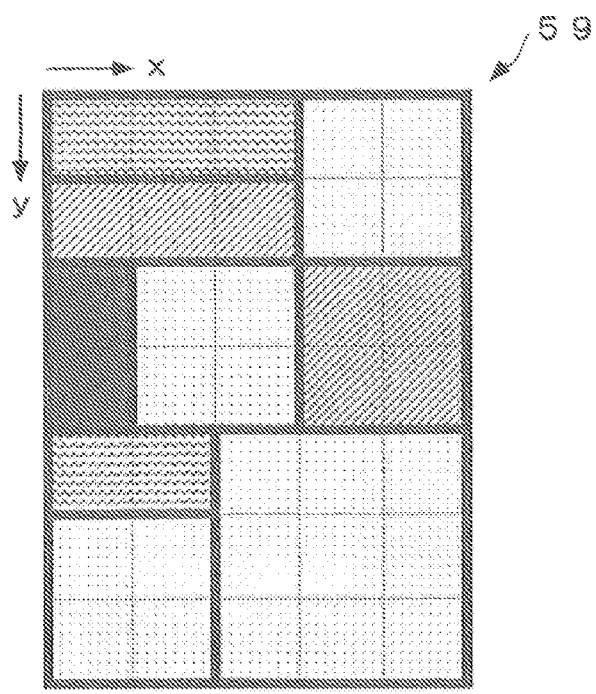
FIG. 13 is a schematic diagram showing an exemplary rectangular region into which the rectangular regions of FIG. 12 are put together.

As described above, when a segmentation by uneven division into partial regions with different size and shape is completed for the heat map image 50, the segmentation of the image 59 as shown in FIG. 13 is applied to image data of the original image 40 to acquire an image for the image 40 corresponding to the segmentation of the image 51 divided into the partial region as shown in FIG. 6, and the control unit 11a terminates the sub-routine processing of dividing the image into divided images based on the characteristic amount in step S1. Then, the control unit 11a starts the processing in step S2 and finally calculates the image 45 with a low resolution for the image 40, or the like. The segmentations in FIG. 6 and FIG. 13 are schematically exemplified and thus do not match each other.

Scenario reproduction in the portable terminal 20 will be described below with reference to FIG. 7.

In FIG. 7, the resolution is higher in the order of the image 45, the image 46 and the image 47. The image 47 and the image 48 are at the same level of resolution.

As shown in FIG. 7, the image 45 in which the link frames 45a, 45b, 45c and 45d of the link regions are displayed is displayed on the screen of the display unit 21 of the portable terminal 20. The link frames 45a, 45b, 45c and 45d are displayed in green dotted lines, blinked or changed in color to be conspicuous for the user. The screen is displayed on the display unit 21 in the portable terminal 20 for a while. In this way, the image processing server 11 functions as an exemplary link region visualizing means that performs image processings on the link regions to be visible. The display frames 46B, 47B and 48B are only described for easy understanding of the associations with the images 46, 47 and 48, and thus are not displayed on the screen of the display unit 21.

Then, the user uses the operation unit 22 in the portable terminal 20 to move the pointer and to press a confirmation key or the like in any link region among the link frames 45a, 45b, 45c and 45d, thereby jumping to the URL of a link destination. For example, the link frame 45 of a human face is linked to a Web page having information on face, eyes and mouse or information on products or services. In this way, the image processing server 11 functions as an exemplary associated product linking means that associates the product associated with the divided image to the link region. It functions as an exemplary link region setting means that sets a link region for linking to a predetermined Web page in association with a divided image. For example, the control unit ha sets a link region near a divided image or sets a link region inside a divided image.

Then, the image processing server 11 preferentially displays the characteristic amount, and a divided image having a higher value of the characteristic amount on the image 45 for the display order of the divided images. In this way, the image processing server 11 functions as an exemplary display order deciding means that decides a display order of multiple divided images based on the characteristic amount of each divided image.

As in (1) of FIG. 7, the image in the display frame 465 is enlarged and the image 46 is displayed in the entire screen of the display unit 21 in the portable terminal 20. At this time, other link frames 46a and 46b appear. The link frames 46a and 46b also blink or change in color to be conspicuous for the user. The display frame 46B includes a partial region with a high value of the characteristic amount, and is at the first position from above in the image 45.

The link region of the link frame 46a may be linked to a Web page for another product or service for eyes or a Web page for providing more detailed information. The link region of the link frame 46b may be linked with a Web page for information on products or services for mouse, lips and teeth. The image processing server 11 may process the image data by rotating the image 46 or changing the size of the image to be conspicuous for the user.

As in (2) of FIG. 7, the processing temporarily returns to the image 45, and as in (3) of FIG. 7, the image 45 is zoomed up to the image 47. The display frame 47B includes a partial region having a high value of the characteristic amount and is at the second position from above in the image 45. The link frame 47a is linked with a Web page for information on watches or products. The image 47 is rotated and is displayed for a while, and then the image displayed on the display unit 21 is returned to the image 45 as in (4) of FIG. 7.

Then, as in (5) of FIG. 7, the image temporarily containing a partial region having a high value of the characteristic amount and being in the display frame 48B at the third position from above in the image 45 is zoomed up. The image 48 displays therein a link frame 48a to surround a button of the clothes. The link frame 48a is linked with a Web page for information on buttons or products. After the image 48 is displayed for a while, the image displayed in the display unit 21 is returned to the image 45 as in (6) of FIG. 7. Then, the procedures (1) to (6) are repeated.

The image displayed in the display unit 21 may be directly moved from the image 47 toward the image 48 at the same resolution level in parallel. When the image is moved from the image 46 toward the image 47 at different resolution levels, the image is moved to a position corresponding to the image 47 at the resolution of the image 46 and then is zoomed up, and the image displayed in the display unit 21 is moved to the image 47. The image may be continuously moved such that the user does not feel uncomfortable.

As described above, according to the present embodiment, the image processing server 11 calculates the characteristic amount of a region in the image (the original image 40), divides the image into a plurality of partial regions at least one of which has a different size, on the basis of the characteristic amount, thereby to acquire the divided images P1, P2 and P3, decides a display order of the divided images based on the characteristic amounts, sets the link regions (51a, 51b, 51c) (45a, 45b, 45c) for linking to predetermined Web pages in association with the divided images, and thus causes the portable terminal 20 to automatically reproduce the divided image setting the link region therein without a user's direct operation, so that the user clicks his/her-interested part to access other information, thereby achieving user convenience at the terminal.

The image processing server 11 can present the images to the user in an order in which the user easily pays attention, thereby achieving user convenience. The characteristic amount as an exemplary characteristic amount of the image is used so that the image processing server 11 can set a link region in the image to which the user easily pay attention, thereby enhancing user convenience.

When the image processing server 11 transmits the image data of the divided image and the data of the link region based on the display order of the divided images decided by the characteristic amount, the image for which the link region is set can be automatically received in the order of notable images without a user's operation, thereby enhancing user convenience.

When the image processing server 11 performs image processings on the link region to be visible, the link frames 45a, 45b and 45c, which are colored, blink or change in color, enables the user to easily distinguish the link regions and to easily click the same, thereby enhancing user convenience.

When the image processing server 11 associates a product associated with a divided image to a link region such as the link frame 45a, 45b or 45c, information on a user-interested image item or user-interested information can be provided, thereby enhancing user convenience or finding a product which the user may want and promoting the user to purchase it.

The image processing server 11 extracts the characteristic amount of the image as the characteristic amount of the original image 40 and creates an image of a partial region according to the characteristic amount thereby to transmit the image data to the portable terminal 20 in units of region which the user may be interested in so that a range which the user may want to view can be previously covered to enhance a response property of the image processing and to enhance user convenience. When the characteristic amount is at least one of the value of hue of the image, the value of chromaticness, the value of brightness, the directional component of hue, the directional component of chromaticness and the directional component of brightness, the image is divided on the basis of the characteristic amount (degree of notability) as an index indicating the degree of importance of an object present in the still image for human-vision perception and thus the low-resolution divided image processed by the high characteristic amount is highly likely to be viewed by the user. Thus user convenience is enhanced.

The divided image can be handled by the characteristic amount per divided image and convenience of the divided image can be enhanced. For example, the divided image can be classified by the characteristic amount or specified by the characteristic amount, thereby enhancing user convenience or operability.

The characteristic amount may be indicated by the six components such as the value of hue of the original image 40, the value of chromaticness, the value of brightness, the directional component of hue, the directional, component of chromaticness and the directional component of brightness or may be indicated by at least one of them. The characteristic amount may be a frequency component.

Second Embodiment

An image processing server system according to a second embodiment of the present invention will be described below.

A structure of the image processing server system is the same as that of the image processing server system according to the first embodiment, and an explanation thereof will be made by use of the same reference numerals to the same or corresponding parts as those in the first embodiment.

The operations of the second embodiment according to the present invention will be described with reference to the drawings.

Figure 14:
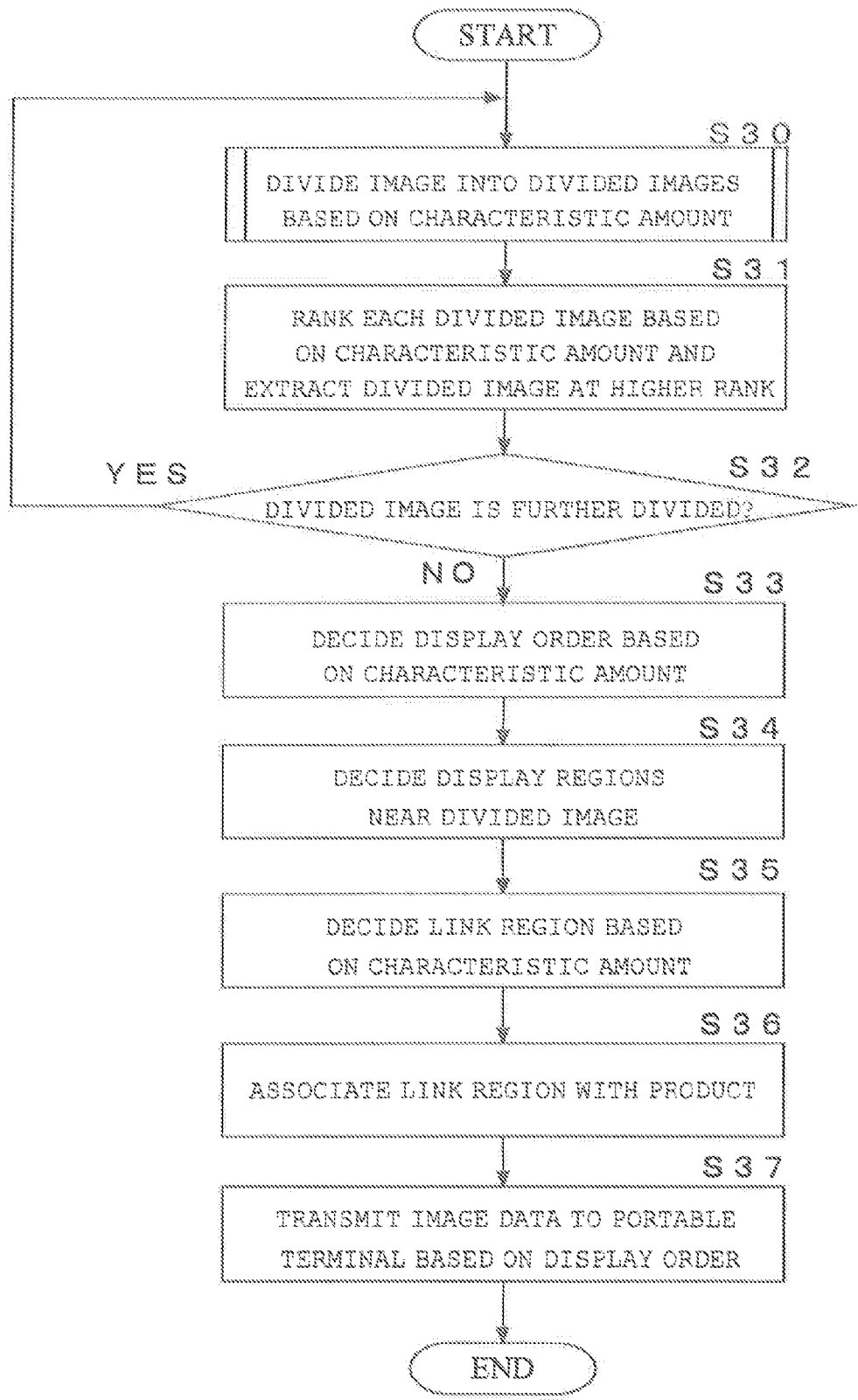
FIG. 14 is a flowchart showing exemplary scenario reproduction according to a second embodiment of the present invention.
Figure 15:
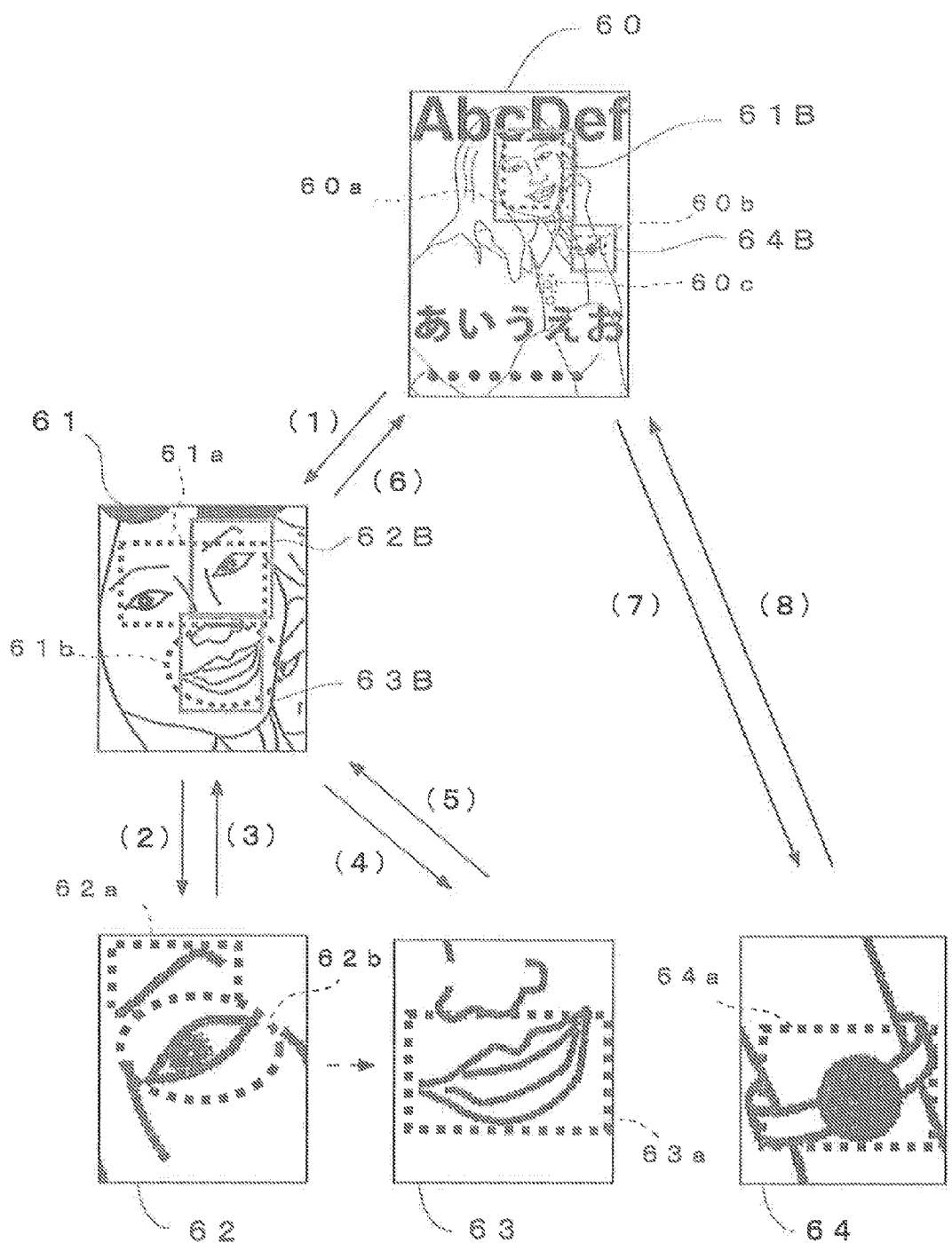
FIG. 15 is a schematic diagram showing exemplary scenario reproduction according to the second embodiment of the present invention.
Figure 16:
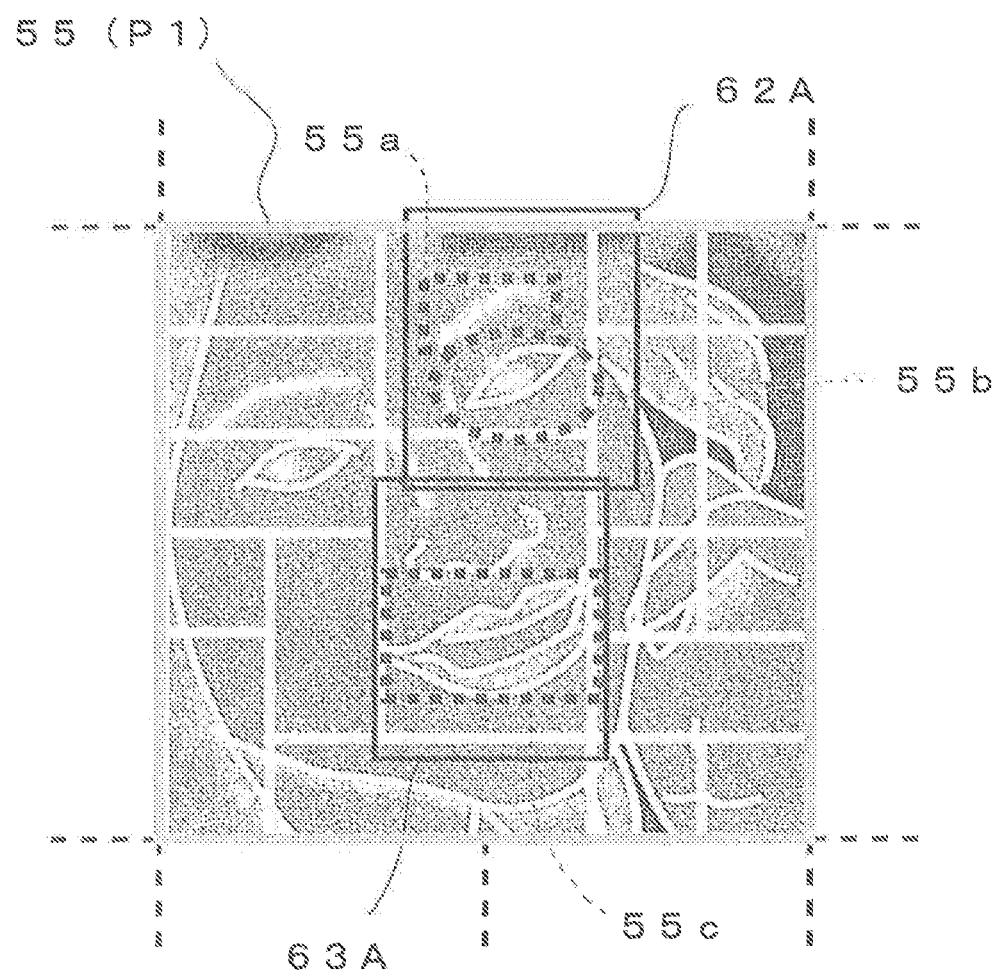
FIG. 16 is a schematic diagram showing an exemplary rectangular region of FIG. 6 further divided into rectangular regions based on The characteristic amount.

FIG. 14 is a flowchart showing exemplary scenario reproduction according to the second embodiment of the present invention, FIG. 15 is a schematic diagram showing exemplary scenario reproduction according to the second embodiment of the present invention. FIG. 16 is a schematic diagram showing, by way of example, how the rectangular region of FIG. 6 is further divided into rectangular regions based on the characteristic amount.

As shown in FIG. 14, the control unit 11a in the image processing server 11 divides an image into partial regions based on the characteristic amount similarly as in step S1 in the first embodiment, thereby acquiring divided images (step S30). An image 55 is divided according to the method for dividing the image 40 or the flowchart shown in FIG. 8 or FIG. 9.

Then, the control unit 11a ranks each divided image based on the characteristic amount, and extracts a partial image at a higher rank (step S31). For example, as shown in FIG. 15, the control unit 11a extracts a divided image corresponding to a display frame 61B or a display frame 64B from an image 60.

Then, the control unit 11a determines whether to further divide the divided image (step S32). Specifically, when a difference between the average characteristic amounts of the divided images is smaller, the control unit 11a stops dividing the divided images.

When the divided image needs to be further divided (step S32; YES), the processing returns to step S30, where the control unit 11a further divides the divided image at a higher rank into divided images. Specifically, as shown in FIG. 16, the control unit 11a further divides the image 55 (corresponding to the divided image P1 in FIG. 6) into partial regions. The control unit 11a divides an image 64 in addition to an image 61 corresponding to the image 55 as shown in FIG. 15. Since only the divided images at higher ranks are to be divided, the control unit 11a can limit the divided images to be divided, thereby increasing the processing speed.

As shown in FIG. 16, a divided image corresponding to a display frame 62A or a display frame 63A is extracted from the image 55 (step S31), and as shown in FIG. 15, an image 62 or an image 63 is further divided into divided images based on the characteristic amount (step S30).

On the other hand, when the divided image does not need to be further divided (step S32; NO), the control unit 11a decides a display order based on the characteristic amount (step S33). Specifically, the control unit 11a decides the display order from (1) to (8) based on the resolution of each image as shown in FIG. 15 in addition to the positions of the display frames 61B, 64B, 62B and 63B in the image 60 or the image 61. Step S33 corresponds to step S4 in the first embodiment.

Then, the control unit 11a decides display regions near the divided image to be displayed (step S34), decides a link region based on the characteristic amount (step S35), associates a link region with a product (step S36), and transmits the image data to the portable terminal 20 used on the display order (step S37) similarly as in step S5 to step S8 in the first embodiment. As shown in FIG. 15 or FIG. 16, the display frames 62A and 63A or the display frames 62B and 63B are decided similarly as in the first embodiment. The link frames 55a, 55b, 55c, the link frames 61a, 61b, the link frames 62a, 62b, and the link frame 63a are set as in the first embodiment, and have the same functions.

The scenario reproduction in the portable terminal 20 will be described below with reference to FIG. 15.

As in (1) to (8) in FIG. 15, the images 60, 61, 62, 63 and 64 are displayed as described in the first embodiment. The present embodiment is different from the first embodiment in that the image 61 is further zoomed up.

As described above, according to the present embodiment, an image which has been already zoomed up is further zoomed up so that a scenario property is enhanced, which attracts a user's interest or enhances user convenience. An image of an item present in the original image 40 can be finely handled in a gradual manner, and information on a product or service to be linked to a link frame can be changed depending on a grade of the item image to be displayed, thereby attracting a user's interest or enhancing user convenience. Since a partial region based on the characteristic amount can be extracted from the divided image P1, a partial region to which the user pays attention is different per resolution level particularly when the image is of gigapixels, thereby accurately meeting a user's request and enhancing user convenience. For example, the fact is effective for paying attention to the partial region of an eye out of the entire face after the entire original image 40 is displayed on the display unit 21 in the portable terminal 20, the user pays attention to the partial region of the entire face and the image data of the partial region of the entire face is downloaded.

Figure 17:
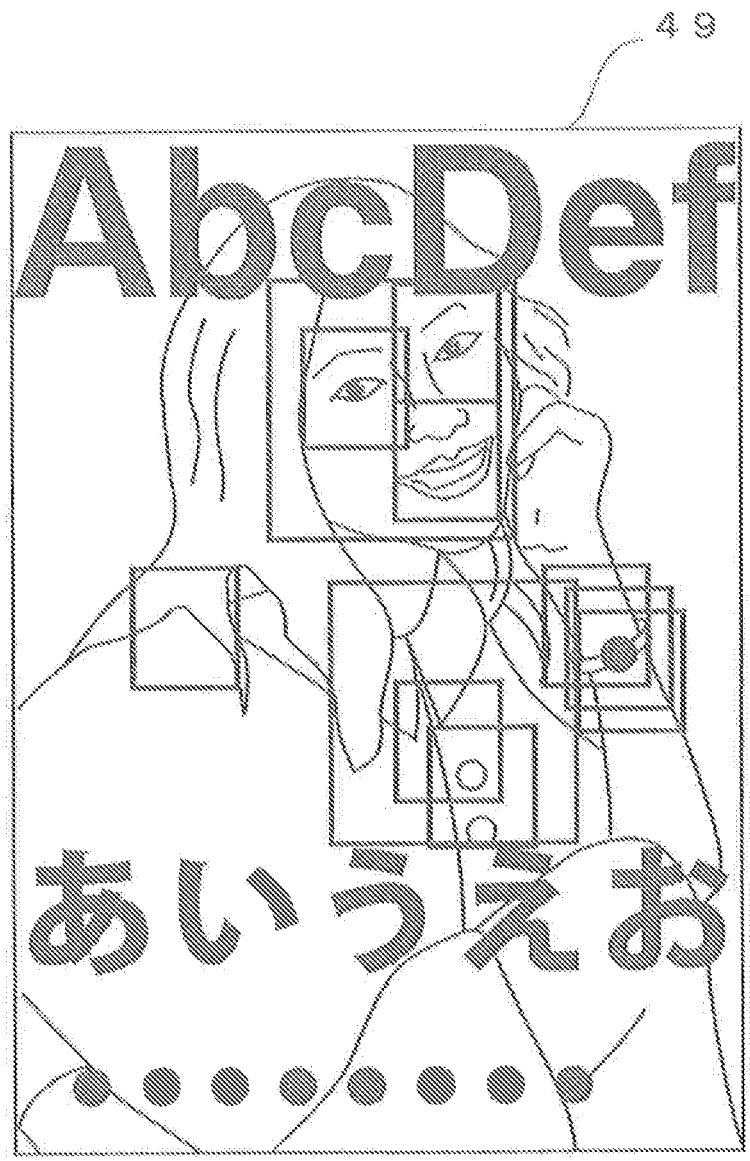
FIG. 17 is a schematic diagram showing how to acquire a user history for scenario reproduction according to a variant of the first and second embodiment by way of example.

As a variant of the first and second embodiments, the image processing server 11 may decide a display order based on user information. As shown in FIG. 17, the statistics indicating which part the user or other user has viewed at which resolution may be acquired for an image 49, and the display order may be decided based on information on view history or ranking or opinions. In this case, the order more desirable for the user can be displayed, thereby enhancing user convenience. In this way, the control unit 11a functions as an exemplary display order deciding means that decides a display order based on the user information.

The processings by the image processing server 11, or the database server 12 or the communication server 13 in the image processing server system 10 may be performed in one server. Not only the multi-core CPU but also a grid computer for combining a plurality of computers for calculations may be employed. A PC terminal may be employed, not limited to the portable terminal 20 such as portable wireless phone.

The present invention is not limited to each of the above embodiments. Each of the above embodiments is exemplary, and any embodiment having substantially the same structure as the technical spirit described in Claims of the present invention and having the same operational effects is encompassed in the technical range of the present invention.

REFERENCE SIGNS LIST

10: Image server system
11: Image processing server
11a: Control unit
11b: Storage unit
12: Database server
13: Communication server
40: Original image (image)

The invention claimed is:

1. An image processing device comprising:
a characteristic amount calculating unit that calculates a characteristic amount of a region in an image;
an image dividing unit that divides the image into a plurality of partial regions at least one of which has a different size on the basis of the characteristic amount, and acquires divided images;
a display order deciding unit that decides a display order of the plurality of divided images based on the characteristic amount of each of the divided images; and
a link region setting unit that sets a link region for linking to a predetermined Web page in association with the divided images.

2. The image processing device according to claim 1, further comprising a transmitting unit that transmits image data on the divided image and data on the link region based on the display order.

3. The image processing device according to claim 1, wherein the display order deciding unit decides the display order based on user information.

4. The image processing device according to claim 1, further comprising a link region visualizing unit that performs an image processing on the link region to be visible.

5. The image processing device according to claim 1, further comprising an associated product linking unit that associates a product associated with the divided image to the link region.

6. The image processing device according to claim 1, wherein the characteristic amount is at least one of a value of hue of the image, a value of chromaticness, a value of brightness, a directional component of the hue, a directional component of the chromaticness, and a directional component of the brightness.

7. An image processing method comprising:
a characteristic amount calculating step, implemented by a processor, of calculating a characteristic amount of a region in an image;
an image dividing step, implemented by a processor, of dividing the image into a plurality of partial regions at least one of which has a different size on the basis of the characteristic amount, and acquiring divided images;
a display order deciding step, implemented by a processor, of deciding a display order of the plurality of divided images based on the characteristic amount of each of the divided images; and a link region setting step, implemented by a processor, of setting a link region for linking to a predetermined Web page in association with the divided images.

8. A non-transitory computer readable recording medium recording an image processing program therein, the image processing program causing a computer to function as:
  a characteristic amount calculating unit that calculates a characteristic amount of a region in an image;
  an image dividing unit that divides the image into a plurality of partial regions at least one of which has a different size on the basis of the characteristic amount, and acquires divided images;
  a display order deciding unit that decides a display order of the plurality of divided images based on the characteristic amount of each of the divided images; and
  a link region setting unit that sets a link region for linking to a predetermined Web page in association with the divided images.

* * * * *